(12) United States Patent
Zadeh et al.

(10) Patent No.: US 9,026,259 B2
(45) Date of Patent: May 5, 2015

(54) POWER GENERATION OPTIMIZATION IN MICROGRID INCLUDING RENEWABLE POWER SOURCE

(75) Inventors: Mohammad Reza Dadash Zadeh, London (CA); Amirhossein Hajimiragha, Richmond Hill (CA); Michael Joseph Krok, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 724 days.

(21) Appl. No.: 13/358,487

(22) Filed: Jan. 25, 2012

(65) Prior Publication Data

US 2013/0190938 A1     Jul. 25, 2013

(51) Int. Cl.
 G05D 3/12   (2006.01)
 H02J 3/38   (2006.01)
 H02J 13/00  (2006.01)
 H02J 3/00   (2006.01)

(52) U.S. Cl.
 CPC ............. *H02J 3/382* (2013.01); *H02J 13/0013* (2013.01); *H02J 2003/003* (2013.01); *H02J 2003/007* (2013.01); *Y02B 90/2607* (2013.01); *Y02E 40/76* (2013.01); *Y02E 60/76* (2013.01); *Y04S 10/123* (2013.01); *Y04S 10/54* (2013.01); *Y04S 10/545* (2013.01); *Y04S 40/12* (2013.01); *Y04S 40/22* (2013.01)

(58) Field of Classification Search
 CPC ....... H02J 13/0013; H02J 3/382; G06Q 10/06
 USPC ........................................................ 700/291
 See application file for complete search history.

(56) References Cited

U.S. PATENT DOCUMENTS

| 8,604,641 | B2* | 12/2013 | Walker ............................ 307/72 |
| 2001/0039481 | A1 | 11/2001 | Tremblay et al. |
| 2006/0276938 | A1* | 12/2006 | Miller ............................ 700/295 |
| 2009/0062969 | A1* | 3/2009 | Chandra et al. ............... 700/291 |
| 2010/0114799 | A1 | 5/2010 | Black et al. |
| 2010/0274407 | A1 | 10/2010 | Creed |
| 2011/0155583 | A1 | 6/2011 | Li |
| 2011/0220516 | A1 | 9/2011 | Finfrock et al. |

FOREIGN PATENT DOCUMENTS

WO   03056481 A2   7/2003

OTHER PUBLICATIONS

Wikipedia entry of "NP-hard", Date Unknown.
(Continued)

*Primary Examiner* — Robert Fennema
*Assistant Examiner* — Sivalingam Sivanesan
(74) *Attorney, Agent, or Firm* — Sutherland Asbill & Brennan LLP (57) ABSTRACT

A microgrid including a renewable power source is optimized by treating the renewable source as operating in an isochronous mode, and by decomposing the optimization process. A renewable capability is defined for the renewable source to enable treatment of the renewable source as operating in an isochronous mode. The renewable capability may be based on a power rating of the renewable source. An objective function of the microgrid optimization problem may then be optimized while treating the renewable source as operating in an isochronous mode. A penalty factor may be applied to avoid power shortage.

20 Claims, 4 Drawing Sheets

(56) References Cited

OTHER PUBLICATIONS

Azmy, et al., "Management of PEM Fuel Cells for Residential Applications Using Genetic Algorithms", Department of Electrical Engineering, University of Duisberg-Essen, Germany.

Mohamed, et al., "Environmental/Economic Power Dispatch of MicroGrid Using Multiobjective Genetic Algorithms", International Renewable Energy Congress, Nov. 5-7, 2010, Sousse, Tunisia.

Bagherian, et al., "A developed Energy Management System for a Microgrid in the Competitive Electricity Market", 2009 IEEE Bucharest Power Tech Conference, Jun. 28-Jul. 2, Bucharest, Romania.

Nunna et al., "Optimal Management of Microgrids", IEEE, 2010.

Niinisto, Arto, Simulation of the Management of the Micro Grid with Wind, Solar, and Gas Generators.

Mohamed, et al., System modelling and online optimal management of MicroGrid using Mesh Adaptive Direct Search, Electrical Power and Energy Systems 32 (2010) 398-407.

Logenthiran, et al., "Short Term Generation Scheduling of a Microgrid", IEEE 2009.

Alkhalil, et al. "Fuel consumption optimization of a multimachine microgrid by secant method combined with IPPD table", International Conference on Renewable Energies and Power Quality, Valencia, Spain, Apr. 15-17, 2009.

Hernandez-Aramburo, et al., "Fuel Consumption Minimization of a Microgrid", IEEE 2005.

Carrion, et al., "A Computationally Efficient Mixed-Integer Linear Formulation for the Thermal Unit Commitment Problem", IEEE 2006.

El-Sharkh, "Evolutionary programming-based methodology for economical output power from PEM fuel cell for micro-grid application", Journal of Power Sources 139 (2005) 165-169.

Padhy, Narayana Prasad, "Unit Commitment—A Bibliographical Survey", IEEE 2004.

Nowak, et al., "Stochastic Lagrangian Relaxation Applied to Power Scheduling in a Hydro-Thermal System under Uncertainty", Annals of Operations Research, 100, 251-272, 2000.

Arroyo, et al., Optimal Response of a Thermal Unit to an Electricity Spot Market, IEEE Transactions on Power Systems, vol. 15, No. 3, Aug. 2000.

Sheble, et al., "Unit Commitment Literature Synopsis", IEEE 1993.

Lauer, et al., "Solution of Large-Scale Optimal Unit Commitment Problems", IEEE 1981.

Turgeon, Andre, "Optimal Scheduling of Thermal Generating Units", IEEE Transactions on Automatic Control, vol. AC-23, No. 6, Dec. 1978.

Dillon et al., "Integer Programming Approach to the Problem of Optimal Unit Commitment with Probabilistic Reserve Determination", IEEE Transactions on Power Apparatus and Systems, vol. PAS-97, No. 6, Nov./Dec. 1978.

Pang et al., "Optimal Short-Term Thermal Unit Commitment", IEEE Transactions on Power Apparatus and Systems, vol. PAS-95, No. 4, Jul./Aug. 1976.

U.S. Appl. No. 13/342,578, Notice of Allowance and Fees Due, Apr. 16, 2014, 13 pages.

* cited by examiner

FIG. 4 ized source to mitigate frequency deviations and to maintain a consistent system frequency. As used herein, "isochronous" means substantially steady frequency. Thus, an isochronous mode of a power source is a mode in which power is generated to maintain substantially constant frequency over time. An isochronous source or machine in the system may change its output to catch load swing, maintain load-generation balance, and hence, stabilize the frequency and/or mitigate load-generation imbalance. An isochronous machine may perform this task by employing a control system that measures system frequency and adjusts generated power accordingly.
POWER GENERATION OPTIMIZATION IN MICROGRID INCLUDING RENEWABLE POWER SOURCE

BACKGROUND OF THE INVENTION

The disclosure relates generally to power generation, and more particularly to optimization of power generation in a microgrid that includes at least one renewable power source.

In power generation, it is becoming more common for power system assets to include a mixture of renewable and non-renewable power generation sources, particularly in so-called "smart grid" power generation and distribution. Particularly with regard to power systems including renewable energy sources, excess energy may be stored for use during times when power demand exceeds power generation capacity, though in a mixed-generation environment, non-renewable sources may be called upon instead of, or in addition to, stored energy. It is often desirable to optimize use of renewable, non-renewable, and stored energy resources so that they may be used more advantageously.

Generation optimization techniques for microgrid applications typically use load and renewable power generation forecasts to calculate a shortage of power that should be covered by non-renewable sources and/or energy storage devices. Optimization-oriented calculations, referred to as optimal dispatch scheduling, are performed based on a calculated power shortage to determine optimal set points for these devices. In such optimization techniques, a non-renewable source is typically assumed to act as an isochronous source to mitigate frequency deviations and to maintain a consistent system frequency. As used herein, "isochronous" means substantially steady frequency. Thus, an isochronous mode of a power source is a mode in which power is generated to maintain substantially constant frequency over time. An isochronous source or machine in the system may change its output to catch load swing, maintain load-generation balance, and hence, stabilize the frequency and/or mitigate load-generation imbalance. An isochronous machine may perform this task by employing a control system that measures system frequency and adjusts generated power accordingly.

To perform frequency adjustment and/or mitigate load-generation imbalance, an isochronous machine should set a reserve margin aside during normal operation. For example, if the maximum microgrid load is 100 kilowatts (kW) and isochronous source rating is 50 kW, a ±10 kW margin may be set aside from the isochronous source, and the machine may not be permitted to produce more than 40 kW and/or less than 10 kW during normal operation (steady state). For a non-renewable power source like a diesel-powered generator, that upper bound (50 kW) is fixed and achievable; however, for a renewable power source, the upper bound may decrease due to intermittency (dry day for hydroelectric, cloudy day for solar and/or combined solar and energy storage, calm day for wind and/or combined wind and energy storage, etc.), which may lead to infeasibility of the optimization problem. As a result of these and other factors, a model assuming isochronous power generation may not accurately represent the behavior of many renewable power sources since power generation by renewable power sources may fluctuate due to changes in wind speed, cloud cover, water levels, or other environmental factors that might affect a particular renewable power source.

In order to formulate an optimal dispatch technique within a microgrid, a variety of operational limitations and complex constraints should be considered. Depending on the number and nature of devices or assets within a microgrid, these constraints and limitations may render optimization practically unsolvable with currently available computational algorithms and resources, in particular for the fast-response requirements of real-time applications. For example, if power generation optimization is formulated in the form of mixed integer nonlinear programming (MINLP) or mixed integer linear programming (MILP) problems, operational constraints that are typically complex may be considered, but require substantial computing resources and time. In fact, MINLP and MILP analyses present such computational challenges that the use of these techniques may be impractical for real-time and fast-response applications. Conventional linear programming (LP) is a practical technique as far as processing overhead, but may not be suitable since LP can not consider the above-mentioned, complex operational constraints. In addition to this problem, conventional dispatch optimization is typically based on separate integer programming (IP) and LP solution branches, and the potential of energy storage utilization is generally ignored in the IP. This may result in unnecessary commitment of non-renewable power sources, which may result in lost opportunities for storing excess energy that may later be retrieved from storage instead of committing non-renewable units.

BRIEF DESCRIPTION OF THE INVENTION

According to an embodiment of the invention disclosed herein, a system for controlling a microgrid may include a dispatch controller configured to communicate with a plurality of microgrid assets, the plurality of microgrid assets including at least one renewable source. The dispatch controller may further be configured to determine an optimized dispatch schedule of the plurality of microgrid assets based on an optimized solution of an optimization problem associated with microgrid operation over a predetermined time horizon. The solution of the optimization problem may be based on at least an objective function associated with microgrid operation, a forecast load, a forecast power production, and a renewable capability of each renewable power source, renewable capability being a parameter representing a percentage of a power rating of the respective renewable source being treated as operating in an isochronous mode.

Another embodiment of the invention disclosed herein may have a dispatch control system configured to operate in response to algorithmic software to generate an optimized dispatch schedule for a plurality of assets of a microgrid, the plurality of assets including a renewable source. The generation of the optimized dispatch schedule may be based on at least an objective function associated with operation of the plurality of assets, a forecast load, a forecast power production of the renewable source, and a renewable capability for each respective renewable power source being treated as an isochronous source. Renewable capability may be a parameter representing a percentage of a power rating of the respective renewable source being treated as operating in an isochronous mode.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

As indicated above, typical microgrid dispatch optimization techniques do not treat renewable power sources as isochronous sources. Rather, renewable sources are typically treated as stochastic sources with only forecasted power generation being taken into account due to strong fluctuations in power generation. However, some renewable power sources, such as hydroelectric power generators, are less intermittent and so may be operated in or treated as operating in an isochronous mode more often to meet microgrid operational constraints. Because renewable power generation sources may not provide a fixed upper bound of power generation in the manner that most non-renewable power generation sources do, a dispatch technique should be reformulated to consider such less-intermittent renewable power generation sources as isochronous sources.

Renewable sources may, for example, be categorized as dispatchable and non-dispatchable. Wind, solar, and hydroelectric renewable sources with small or no reservoir capacity, such as "run of the river" hydroelectric sources, may typically be viewed as non-dispatchable, while dam-based or pumped-storage type hydroelectric sources may be considered as dispatchable. Dispatchable renewable sources may usually be considered as operating in isochronous mode, while non-dispatchable renewable sources may usually not be so considered. Embodiments of the invention disclosed herein may be applied to either dispatchable or non-dispatchable renewable sources, and in particular may allow some non-dispatchable renewable sources, such as less intermittent non-dispatchable renewable sources, to be treated as operating in isochronous mode.

Aspects of the invention provide a method of decomposing a microgrid optimization problem into multiple optimization processes more suitable for real-time applications and otherwise computationally intensive problems. Consideration of renewable sources as operating in isochronous mode and contribution of storage devices in a decomposed and simplified optimization framework may be even more complicated, however. Embodiments of the invention disclosed herein provide a real-time generation optimization technique based on a decomposed optimization formulation that may treat or consider one or more renewable power generation sources as operating in isochronous mode and/or isochronous load sharing mode. To overcome the intermittency or stochastic nature of renewable sources as described above, an upper bound of power production of a renewable source may be multiplied by a parameter called "renewable capability" that reflects a maximum available power generation that may be relied upon from the renewable power source. Renewable capability may, for example, be a percentage of a power rating of a renewable source (e.g., 80%, 90%, or another percentage as may be desired and/or appropriate), and may be represented by $R_{Cap}$. Multiplying the power rating of a renewable power source by its renewable capability yields a decreased upper bound that may be considered in real time in an optimization problem, resulting in a suitable power generation level so that the renewable source may be treated as an isochronous machine.

Microgrids may include a plurality of assets, such as power generation sources, loads or power users or consumers, storage systems or devices, and/or mixed purpose systems or devices. In addition, microgrids may be standalone power generation and distribution networks, may be individually controllable parts of larger power generation and distribution networks, and/or may be a single facility with its own power generation sources, loads/users/consumers, storage systems/devices, and/or mixed purpose devices/systems.

Figure 1:
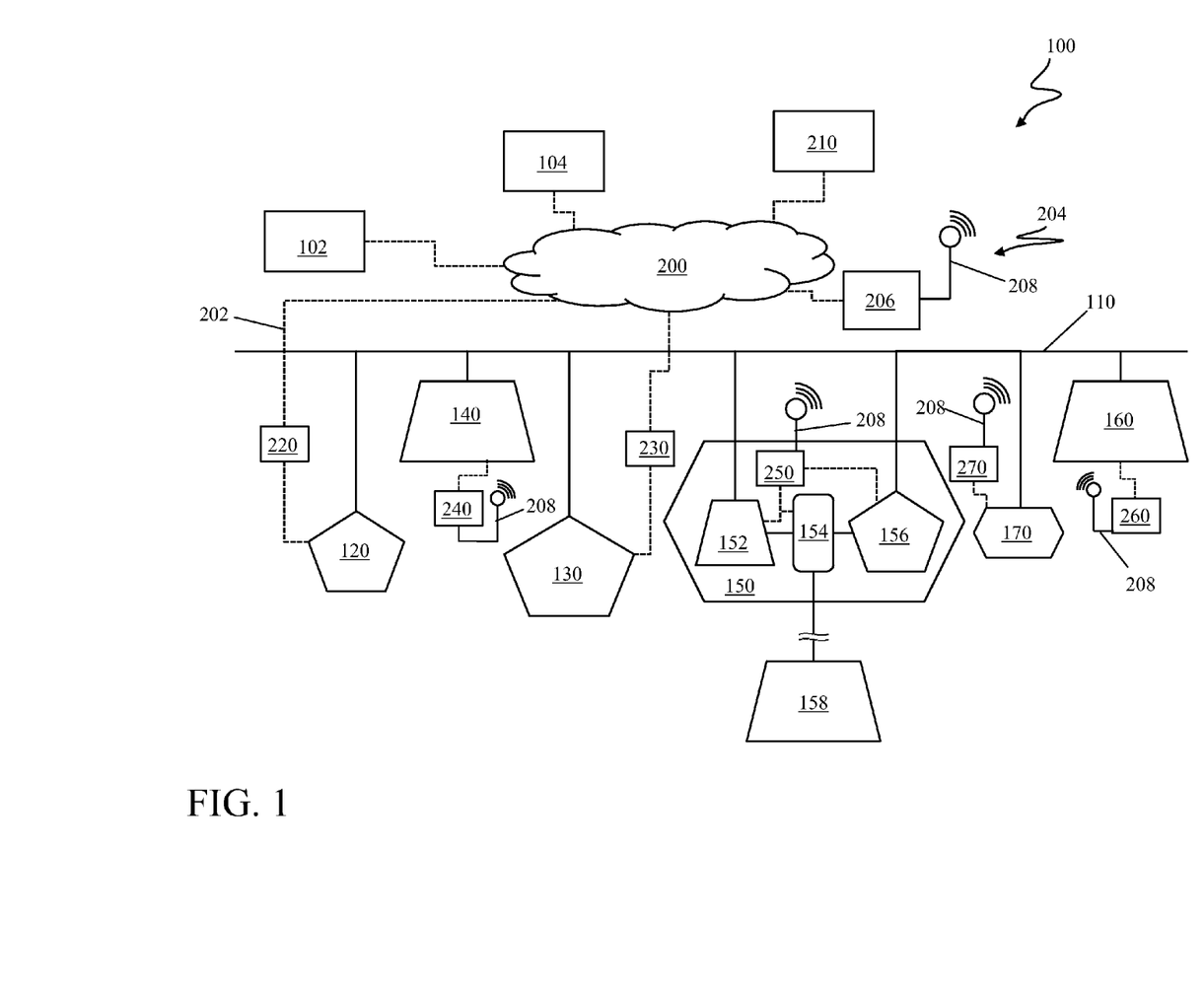
FIG. 1 shows a schematic diagram of a microgrid according to embodiments of the invention disclosed herein.

An example of a microgrid 100 is shown in FIG. 1, in which power sources are represented by pentagonal blocks, loads/power users/consumers are represented by trapezoidal blocks, mixed function devices or assets are represented by hexagonal blocks, and storage devices or assets are represented by ovals. Transmission lines 110 may connect the various devices or assets in microgrid 100. It should be understood that transmission lines 110 represent a distribution network for microgrid 100 and may include multiple sections/segments and/or substations as may be desired and/or appropriate.

Multiple power sources and/or types of power sources may be part of microgrid 100, such as a hydroelectric generator 120, a fuel-burning generator 130, and/or other sources, such as solar power installations, wind turbines, and the like as may be suitable and/or desired. Power produced by these power sources may be delivered via transmission lines 110 to loads, such as a municipality 140, a vehicle charging system 150, and/or a commercial facility 160. In addition, a storage device 170 may draw power from transmission lines 110 to store energy for use during power outages, excess demand, or other situations. It should be understood that municipality 140 may simply be a house in smaller scale embodiments, but may include a multiplicity of buildings from a neighborhood to an entire city. Similarly, commercial facility 160 may simply be a store or the like in smaller installations, but may include manufacturing plants or entire commercial districts. Likewise, storage device 170 may be a single battery or other energy storage device or asset, but may represent larger scale power storage systems.

Vehicle charging system 150 may be considered a mixed purpose device or asset since it may include, for example, an electrolyzer 152 that draws power to produce hydrogen stored in a storage tank 154 or the like, which may supply hydrogen to a fuel cell 156 in addition to a vehicle 158, such as a hydrogen-burning, mixed fuel, and/or hybrid/electric vehicle. Fuel cell 156 may be used to supply power to microgrid 100 via transmission lines 110, while fuel cell 156 may be inactive or supply power locally to a vehicle charging station at other times.

Microgrid 100 may include control units or controllers, represented by rectangular blocks, connected via a communications system 200, which may include a wired network connection 202, a wireless network connection 204, and/or other forms of connections as may be suitable and/or desired. Wireless network connection(s) 204 may include a wireless access point 206 or other radio or light based communications device and an antenna 208 or the like connected to wireless access point 206 and any device in microgrid 100 wirelessly connected to communications system 200. In addition, communications system 200 may be connected to or be part of a larger communications system or network (not shown), such as the internet or a private computer network.

A master controller 210 of microgrid 100, which may be or include a dispatch controller or dispatch control system, may receive data from and issue instructions to local or device controllers, such as a hydroelectric controller 220, a fuel-burner controller 230, a municipality controller 240, a charging system controller 250, a commercial facility controller 260, a storage controller 270, and/or other controllers and/or sensors as may be distributed in microgrid 100. In addition, master controller 210 may receive information from and/or send information to external sources through communications system 200, such as a meteorological/climate information source 102, a usage history information source 104, and/or other external sources as may be appropriate and/or desired. Each local controller may control various aspects of the system or device for which it is responsible and/or may relay information from the system or device to master controller 210.

In embodiments, it may be convenient to use the terms prediction horizon, time interval, and prediction length, which may be known in the art. The prediction horizon, PredictionHorizon, is a predefined period of time over which optimization is to be performed. The time interval, TimeInterval, is a predefined time resolution of optimization, or how often optimization is to be performed during the prediction horizon. For example, a typical time interval may be from 6 to 15 minutes, though other time intervals may be employed. The prediction length, PredictionLength, is the number of time intervals for which optimization is to be performed and may be obtained by dividing PredictionHorizon by TimeInterval. Thus, for a 24-hour prediction horizon and a 12-minute time interval, a prediction length is 120 time intervals. A time step, t, may be used as an index in embodiments and may vary from 1 to the prediction length, where 1 is the present time step. In addition, an index, i, may be used to distinguish between renewable power sources, storage devices/systems, and/or loads, while $R_N$, $S_N$, $L_N$ may be used to represent the number of renewables, storage devices, and loads, respectively. To simplify implementation of embodiments, all parameters may be expressed in terms of time step, time interval, and prediction length.

Figure 2:
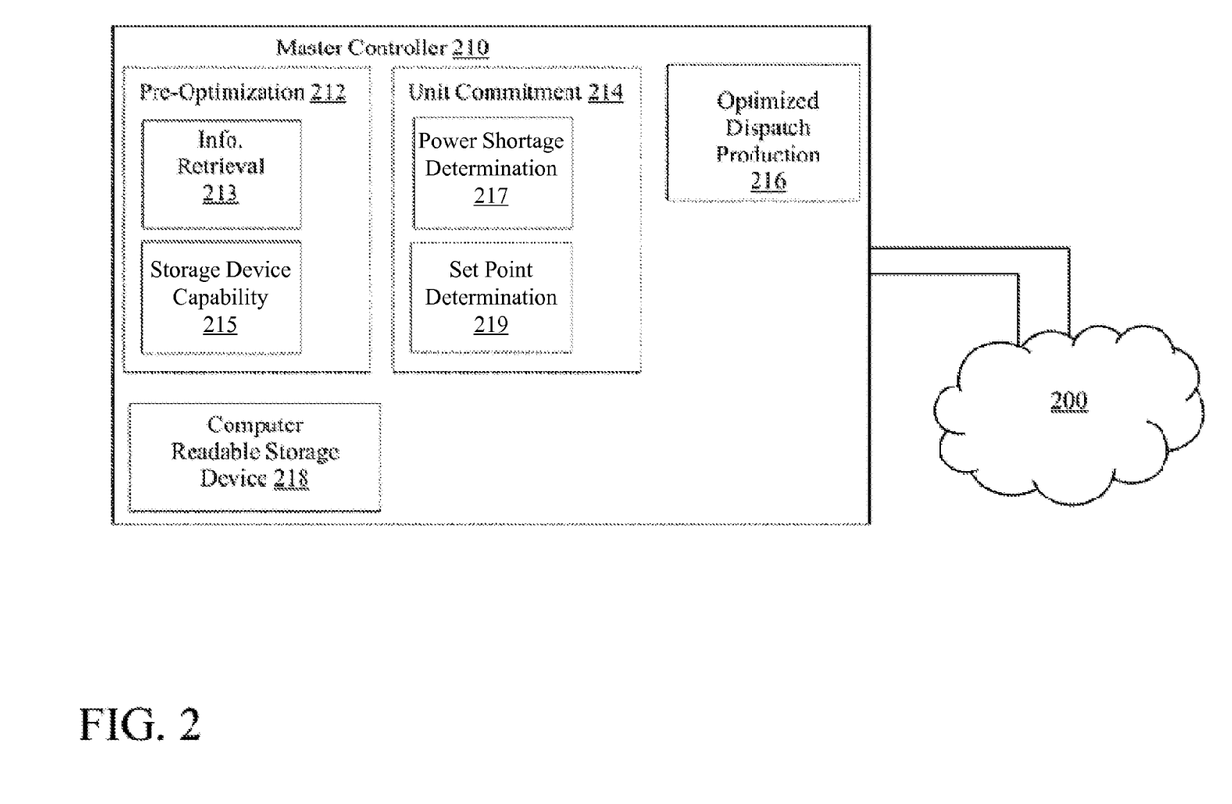
FIG. 2 shows a schematic diagram of a microgrid optimization controller according to embodiments of the invention disclosed herein.
Figure 3:
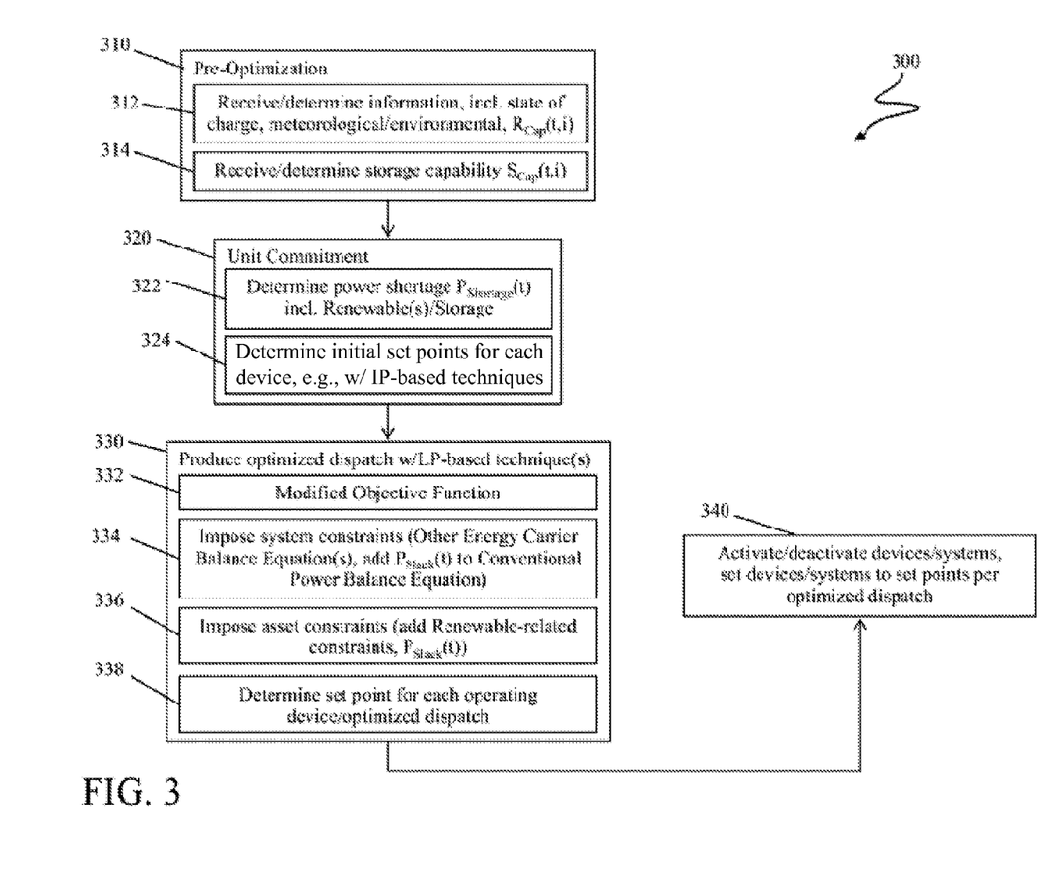
FIG. 3 shows a schematic flow diagram of a microgrid optimization method according to embodiments of the invention disclosed herein.

Referring to FIG. 2, embodiments may be implemented in master controller 210, which may execute a microgrid optimization method 300, an example of which is shown in FIG. 3, such as with algorithmic software, a predictive optimization control routine, or the like. The operation of components of master controller 210 will be illustrated with regard to the description of method 300, below. It should be understood that while master controller 210 refers to modules, and while the description of method 300 refers to phases or stages, neither of these is limiting. Rather, modules, stages, and phases may be used for simplicity and clarity of description.

Master controller 210 may include a pre-optimization module 212, which may execute or perform a first or pre-optimization stage (block 310) of method 300, a second or unit commitment module 214, which may execute or perform a second or unit commitment stage (block 320) of method 300, and a third or optimized dispatch production module 216, which may execute or perform a third or optimized dispatch production stage (block 330) of method 300. Pre-optimization module 212 may include an information retrieval module 213 configured to retrieve and/or receive predefined values of variables, such as by executing or performing information retrieval (block 312) of method 300, and a storage device capability module 215 may use gathered information to determine a state and/or capacity and/or capability of a storage device(s) of microgrid 100, such as by executing or performing storage capability determination (block 314) of method 300. Unit commitment module 214 may include a power shortage determination module 217 and a set point determination module 219, which may execute or perform corresponding portions of method 300 (blocks 322, 324).

As seen schematically in FIG. 3, embodiments of the invention disclosed herein may also take the form of a method 300 that may be viewed as having three major stages including a first or pre-optimization stage 310, a second or unit commitment stage 320, and a third or optimized dispatch production stage 330. In pre-optimization stage 310, information may be received and/or retrieved (block 312) and capability of storage devices may be determined (block 314). Information that may be received and/or retrieved in block 312 may include meteorological and/or environmental observation data, a storage device state of charge, a renewable power source power production capability, and/or other data that may affect optimization of microgrid 100. Renewable power production capability or renewable capability for each renewable power source such as hydroelectric generator 120, operating in an isochronous mode may be represented by an array $R_{Cap}(t,i)$, where t varies from 1 to PredictionLength and i varies from 1 to $R_N$. $R_{Cap}(t,i)$ thus indicates the power production capability for $R_i$ at each time step t to be considered. This capability may be the percentage of renewable power rating $P_{RMax}(i)$ that is available for generation at each time interval over the prediction horizon. $R_{Cap}(t,i)$ may, for example, be provided by an operator, by retrieval from a computer readable storage device, by analysis of meteorological observation data, and/or other means as may be desirable and/or suitable. For each renewable power source $R_i$ operating in non-isochronous mode, renewable capability $R_{Cap}(t,i)$ is not used and may be set to one or any other value in embodiments of the invention disclosed herein. As indicated above, only renewable sources operating in or treated as operating in isochronous mode may be included in embodiments.

Determination of storage capability in block 314 may be performed for each storage device $S_i$ and may be represented by an array $S_{Cap}(t,i)$, where t varies from 1 to PredictionLength and i varies from 1 to $S_N$. Like $R_{Cap}(t,i)$, $S_{Cap}(t,i)$ may, for example, provide information regarding discharging capability of a respective storage device $S_i$ at each time interval t over the prediction horizon. The capability of a storage device $S_i$ in the first time step, $S_{Cap}(1,i)$, may be determined using a metered state of charge $S_{SOCInitial}(i)$ and storage parameters of the respective storage device $S_i$ as follows:

$$S_{Cap}(1, i) = \max\left\{\min\left(\frac{(S_{SOCInitial}(i) - S_{SOCMin}(i))}{TimeInterval \times P_{SMaxOut}(i)} \times S_{EfficiencyOut}(i), 1\right), 0\right\}, \quad (1)$$

where:
max and min are maximum and minimum functions, respectively, which may be used to limit storage capability to zero and one, $S_{SOCMin}(i)$ is the minimum acceptable state of charge of storage device $S_i$, $P_{SMaxOut}(i)$ is the maximum output power of storage device $S_i$, and $S_{EfficiencyOut}(i)$ is the discharging efficiency of storage device $S_i$.

In embodiments, $S_{SOCMin}(i)$, $P_{SMaxOut}(i)$, and $S_{EfficiencyOut}(i)$ may be retrieved from the devices themselves, may be retrieved from computer readable storage devices, including remote devices reachable via communications system 200, may be received as input from a user, and/or may be received by any other method as desired and/or suitable.

Storage capability may be determined for the first time interval, t=1, but may be set to one for the remainder of the prediction horizon in embodiments. Therefore, for storage device $S_i$ at t=2 to t=PredictionLength, storage capability $S_{Cap}(t,i)$ may be assumed to be one. It may also be assumed that the storage device $S_i$ may be capable of discharging at its respective maximum output rating power for the second time interval t=2 to the remainder of the prediction horizon, which may provide an opportunity to optimally utilize the storage device as much as possible while ensuring that there is enough charge in the storage device $S_i$ for the present time interval.

In second or unit commitment stage 320 of embodiments, still referring to FIG. 3, power demand and supply may be evaluated to determine what a power shortage may be for a given time interval during the prediction horizon (block 322). IP-based techniques may then be employed to determine initial set points for devices in microgrid 100 (block 324). Such initial set points may simply be an indication as to whether a particular device should be operating or should not be operating.

While power shortage typically is expressed as an amount of power not covered by renewable power sources, embodiments additionally may consider power available from power storage devices. Thus, power shortage, $P_{Shortage}(t)$, may be defined in embodiments as an amount of power not covered by renewable sources and storage devices, which power shortage must be supplied by non-renewable power sources, such as fuel-burning generator 130. While typical analyses use forecasted values for renewable sources ($P_{RForecast}(t,i)$) regardless of operating mode, embodiments of the invention disclosed herein may use the product of renewable power source rating and renewable capability ($P_{RMax}(i) \times R_{Cap}(t,i)$) for renewable power sources operating in or treated as operating in isochronous mode. In addition, the product of maximum storage discharging power and storage capability ($P_{SMaxOut}(i) \times S_{Cap}(t,i)$) for each storage device, which may be determined, for example, in the first stage 310 of embodiments as disclosed above, may be used in the determination of power shortage in power source commitment. Thus, power shortage at each time step, t, may be calculated from the following equation:

$$P_{Shortage}(t) = \quad (2)$$

$$(1 + IsocMrg_{Pos})\sum_{i=1}^{L_N} P_{LForecase}(t, i) - \sum_{\substack{i=1 \\ R_{OpMode}(i)=0}}^{R_N} P_{RForecast}(t, i) -$$

-continued $$\left( \sum_{\substack{i=1 \\ R_{OpMode}(i)=1}}^{R_N} (P_{RMax}(i) \times R_{Cap}(t, i)) + \sum_{i=1}^{S_N} (P_{SMaxOut}(i) \times S_{Cap}(t, i)) \right)$$

where:
$S_{Cap}(t,i)$ is the capability of storage device $S_i$ at time t,
$P_{SMaxOut}(i)$ is the maximum discharging power of storage device $S_i$,
$P_{RMax}(i)$ is the power rating of renewable power source $R_i$,
$R_{Cap}(t,i)$ is the renewable capability of renewable power source $R_i$ at time t,
$P_{Shortage}(t)$ is the power shortage at time t,
$P_{LForecast}(t,i)$ is the forecasted load $L_i$ at time t,
$P_{RForecast}(t,i)$ is the forecasted power of renewable power source $R_i$ at time t,
$IsocMrg_{Pos}$ is an isochronous reserve margin in positive direction (percentage of total load) of the renewable power source $R_i$, and
$R_{OpMode}(i)$ is a Boolean indication of the operating mode of renewable power source $R_i$ in which 0 indicates non-isochronous operating mode and 1 indicates isochronous operating mode.

In embodiments, as with the variables related to the determination of storage capacity above, $P_{SMaxOut}(i)$, $P_{RMax}(i)$, $P_{LForecast}(t,i)$, $P_{RForecast}(t,i)$, $IsocMrg_{Pos}$, and $R_{OpMode}(i)$ may be retrieved from respective devices themselves, may be retrieved from computer readable storage devices, including remote devices reachable via communications system 200, may be received as input from a user and/or another process, and/or may be received by any other method as desired and/or suitable.

Knowing the power shortage for each time interval over the prediction horizon, the unit commitment problem may be solved using dynamic programming, a branch-and-bound method, or other appropriate technique to determine the commitment of non-renewable units, which may indicate whether each device or asset is operating (on/off). In particular, the unit commitment may be an initial commitment and may simply be a binary number for each non-renewable source, with a zero representing non-operation and a one representing operation for a respective source. This may be expressed, for example, in a one-dimensional array of binary numbers whose length is equal to the number of non-renewable sources considered.

Once unit commitment has been determined, a third or optimized dispatch production stage 330 of embodiments may include applying conventional linear programming to refine results of unit commitment stage 320 to better optimize operation of microgrid 100. In embodiments, refining the results of unit commitment stage 320 may include determining set points for devices that should be operating. In addition, the unit commitment may be changed to better optimize overall operation of microgrid 100. Thus, if optimized dispatch production stage 330 determines that the microgrid would be better optimized if a source were not operating that had been set to operate by the unit commitment stage, the unit commitment for that unit may be changed to off, and vice versa.

A typical generation optimization problem for a microgrid includes an objective, such as minimizing total operation costs over the prediction horizon. Thus, an objective function may be identified and modified (block 332) in embodiments, such as a cost minimization objective function. In addition, for each time interval, (i.e., t=1 to PredictionLength), several system constraints may be imposed (block 334), such as electricity and/or heat balance, and asset constraints may also be imposed (block 336), such as minimum energy/power requirements for various power sources of the microgrid.

An array of variables defining the renewable generating power may be added to the optimization problem as part of system and/or asset constraints (blocks 334, 336), all of which may be used to determine set points of microgrid devices to form an optimized dispatch (block 338). If a renewable power source $R_i$ is not operating in isochronous mode, its forecast information may be assigned as a constraint to corresponding variables as set forth, for example, in equation (3):

$$\text{if } R_{OpMode}(i)=0 \rightarrow P_R(t,i)=P_{RForecast}(t,i), i=1 \text{ to } R_N \quad (3)$$

where $P_R(t,i)$ is power generated by renewable power source $R_i$ at time t, which may be obtained, for example, from another process, a computer readable storage medium, user input, or any other suitable source. If a given renewable power source $R_i$ is operating in isochronous mode, an isochronous reserve margin may be considered in both the positive and negative directions, and two sets of additional constraints may be added to enhance optimization of microgrid 100 so that:

$$\text{if } R_{OpMode}(i) = 1 \rightarrow \quad (4)$$

$$P_R(t, i) \leq \left( P_{RMax}(i) \times R_{Cap}(t, i) - IsocMrg_{Pos} \times \sum_{i=1}^{L_N} P_{LForecast}(t, i) \right)$$

$$\text{if } R_{OpMode}(i) = 1 \rightarrow P_R(t, i) \geq$$

$$\left( P_{RMin}(i) + IsocMrg_{Neg} \times \sum_{i=1}^{L_N} P_{LForecast}(t, i) \right)$$

where $P_{RMin}(i)$ is the minimum power generated by renewable power source $R_i$ and $IsocMrg_{Neg}$ is the isochronous reserve margin in the negative direction (expressed as a percentage of total load). These values may be obtained, for example, from another process, a computer readable storage medium, user input, or any other suitable source.

A positive slack variable, $P_{Slack}(t)$, may be defined and reflected in a power balance equation (equation (5) below) of microgrid 100 in embodiments to ensure the feasibility of the optimization problem. A resulting optimized dispatch may remain feasible even if there is a lack of power due to overestimation of storage capability for future time intervals (t=2 to PredictionLength). Thus, $$\sum_{\substack{x \text{ and } i \in \left\{ \begin{array}{l} \text{Non-renewable,} \\ \text{renewable, discharge of storage} \end{array} \right\}}} P_x(t, i) - \quad (5)$$

$$\sum_{\substack{x \text{ and } i \in \left\{ \begin{array}{l} \text{Loads and} \\ \text{charging of storage} \end{array} \right\}}} P_x(t, i) + P_{Slack}(t) = 0 \quad P_{Slack}(t) \geq 0$$

Since a power shortage is not desirable, the slack variable may be severely penalized in the objective function to avoid unnecessary power shortage in the optimized dispatch resulting from embodiments. For example, the slack variable for the first time interval (t=1) may be more significantly penalized than for subsequent time intervals (t=2 to PredictionLength) so that if there is a potential for a power shortage, it may occur only at the second and subsequent time intervals. While a power shortage may still occur in the optimized dispatch determined according to embodiments, it will not occur in the current time interval since storage capability for the present or current time interval (t=1) is always calculated and updated in the inventive dispatch optimization. In real-time operation, this means that a power shortage should simply not occur. Therefore, an updated objective function considering penalty terms and using cost as an objective may be expressed as:

$$\sum_t \sum_{\substack{x \text{ and } i \in \left\{ \begin{array}{l} \text{Non-renewable,} \\ \text{renewable, storage} \end{array} \right\}}} Cost_x(t, i) + \quad (6)$$

$$P_{Slack}(1) \times K_1 + \sum_{t \neq 1} P_{Slack}(t) \times K_2$$

where $Cost_x$ may correspond to a cost of operation of non-renewable power sources, renewable power sources, and storage devices, and $K_1$ and $K_2$ may be penalty factors. Both $K_1$ and $K_2$ should have positive values. $K_1$ may correspond to the first time interval (t=1) and may be much larger than $K_2$, which may correspond to the second and subsequent time intervals (t=2 to PredictionLength). Embodiments may apply common LP solutions, such as Simplex or interior point, to obtain results from the above equations, which may then be used to produce an optimal dispatch including optimized set points for each of the power sources, loads, and storage devices of microgrid 100.

The inventive method may provide an optimal and/or reliable approach for real-time power generation dispatch in microgrids with renewable generation sources operating in or treated as operating in isochronous mode. When hydroelectric renewable sources are treated as operating in isochronous mode, load and generation balance should be adjusted, a reserve margin should be provided to maintain microgrid stability, and frequency should be controlled at its nominal value during normal operation and contingencies. In this case, the power set points of non-renewable units and storage devices are optimally determined to allow an isochronous renewable unit to pick up the power shortage and provide the required reserve margin taking the renewable capability into account. Devices and/or systems may be activated and/or deactivated, and the devices and/or systems may set points per optimized dispatch (block 340).

Figure 4:
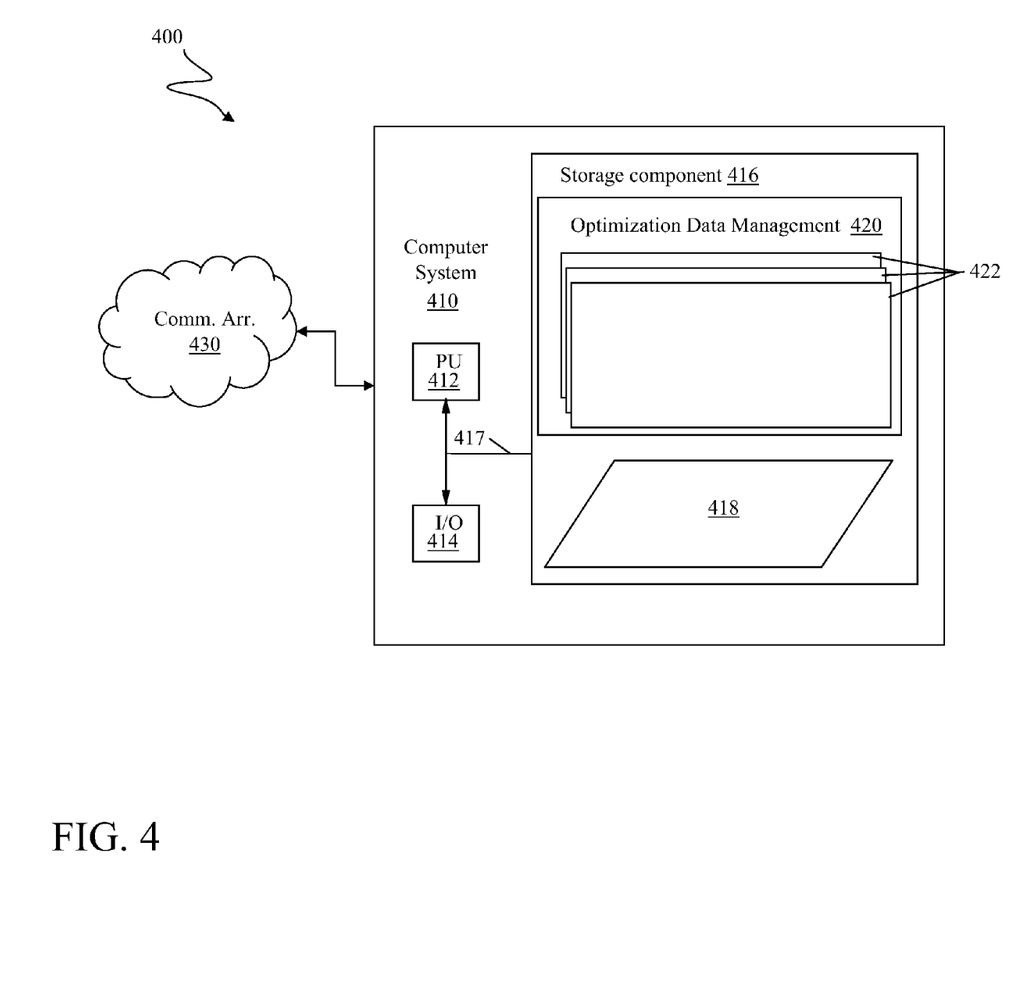
FIG. 4 shows a schematic block diagram of a computing environment for implementing microgrid optimization according to embodiments of the invention disclosed herein.

Turning to FIG. 4, an illustrative environment 400 for an automatic microgrid optimization computer program product is schematically illustrated according to an embodiment of the invention. To this extent, environment 400 includes a computer system 410, such as a master controller 210 or other computing device that may be part of a microgrid 100 that may perform a process described herein in order to execute an automatic microgrid optimization method according to embodiments. In particular, computer system 410 is shown including a microgrid optimization data management program 420, which makes computer system 410 operable to manage data in a microgrid master controller by performing a process described herein, such as an embodiment of the microgrid optimization method discussed above.

Computer system 410 is shown including a processing component or unit (PU) 412 (e.g., one or more processors), an input/output (I/O) component 414 (e.g., one or more I/O interfaces and/or devices), a storage component 416 (e.g., a storage hierarchy), and a communications pathway 417. In general, processing component 412 executes program code, such as microgrid optimization data management program 420, which is at least partially fixed in storage component 416, which may include one or more computer readable storage medium or device. While executing program code, processing component 412 may process data, which may result in reading and/or writing transformed data from/to storage component 416 and/or I/O component 414 for further processing. Pathway 417 provides a communications link between each of the components in computer system 410. I/O component 414 may comprise one or more human I/O devices, which enable a human user to interact with computer system 410 and/or one or more communications devices to enable a system user to communicate with computer system 410 using any type of communications link. In embodiments, a communications arrangement 430, such as networking hardware/software, enables computing device 410 to communicate with other devices in and outside of a node in which it is installed. To this extent, microgrid optimization data management program 420 may manage a set of interfaces (e.g., graphical user interface(s), application program interface, and/or the like) that enable human and/or system users to interact with microgrid optimization data management program 420. Further, microgrid optimization data management program 420 may manage (e.g., store, retrieve, create, manipulate, organize, present, etc.) data, such as microgrid optimization data 418, using any solution.

Computer system 410 may comprise one or more general purpose computing articles of manufacture (e.g., computing devices) capable of executing program code, such as microgrid optimization data management program 420, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer program product when on at least one computer readable medium. It is understood that the term "computer readable medium" may comprise one or more of any type of tangible medium of expression, now known or later developed, from which a copy of the program code may be perceived, reproduced, or otherwise communicated by a computing device. For example, the computer readable medium may comprise: one or more portable storage articles of manufacture, including storage devices; one or more memory/storage components of a computing device; paper; and/or the like. Examples of memory/storage components and/or storage devices include magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other tangible computer readable storage medium now known and/or later developed and/or discovered on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. A technical effect of the executable instructions is to implement an automatic microgrid optimization method and/or system and/or computer program product that uses microgrid device states and capabilities, combined with environmental and/or meteorological information, to produce an optimized microgrid dispatch, including optimized operating values and/or set points for devices of the microgrid. Optimization may take non-linear factors into account without the use of non-linear programming, resulting in reduced processing times that enable real time microgrid optimization.

The computer program code may be written in computer instructions executable by the controller, such as in the form of software encoded in any programming language. Examples of suitable computer instruction and/or programming languages include, but are not limited to, assembly language, Verilog, Verilog HDL (Verilog Hardware Description Language), Very High Speed IC Hardware Description Language (VHSIC HDL or VHDL), FORTRAN (Formula Translation), C, C++, C#, Java, ALGOL (Algorithmic Language), BASIC (Beginner All-Purpose Symbolic Instruction Code), APL (A Programming Language), ActiveX, Python, Perl, php, Tcl (Tool Command Language), HTML (HyperText Markup Language), XML (eXtensible Markup Language), and any combination or derivative of one or more of these and/or others now known and/or later developed and/or discovered. To this extent, microgrid optimization data management program 420 may be embodied as any combination of system software and/or application software.

Further, microgrid optimization program 420 may be implemented using a set of modules 422. In this case, a module 422 may enable computer system 410 to perform a set of tasks used by microgrid optimization data management program 420, and may be separately developed and/or implemented apart from other portions of microgrid optimization data management program 420. As used herein, the term "component" means any configuration of hardware, with or without software, which implements the functionality described in conjunction therewith using any solution, while the term "module" means program code that enables a computer system 410 to implement the actions described in conjunction therewith using any solution. When fixed in a storage component 416 of a computer system 410 that includes a processing component 412, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 410.

When computer system 410 comprises multiple computing devices, each computing device may have only a portion of microgrid optimization data management program 420 fixed thereon (e.g., one or more modules 422). However, it is understood that computer system 410 and microgrid optimization data management program 420 are only representative of various possible equivalent computer systems that may perform a process described herein. To this extent, in other embodiments, the functionality provided by computer system 410 and microgrid optimization data management program 420 may be at least partially implemented by one or more computing devices that include any combination of general and/or specific purpose hardware with or without program code. In each embodiment, the hardware and program code, if included, may be created using standard engineering and programming techniques, respectively.

Regardless, when computer system 410 includes multiple computing devices, the computing devices may communicate over any type of communications link. Further, while performing a process described herein, computer system 410 may communicate with one or more other computer systems using any type of communications link. In either case, the communications link may comprise any combination of various types of wired and/or wireless links; comprise any combination of one or more types of networks; and/or utilize any combination of various types of transmission techniques and protocols now known and/or later developed and/or discovered.

As discussed herein, microgrid optimization data management program 420 enables computer system 410 to implement an automatic microgrid optimization product and/or method, such as that shown schematically in FIG. 3. Computer system 410 may obtain microgrid optimization data 418 using any solution. For example, computer system 410 may generate and/or be used to generate microgrid optimization data 418, retrieve microgrid optimization data 418 from one or more data stores, receive microgrid optimization data 418 from another system or device in or outside of a microgrid, a microgrid controller, a microgrid control system, and/or the like.

In another embodiment, the invention provides a method of providing a copy of program code, such as microgrid optimization data management program 420 (FIG. 4), which implements some or all of a process described herein, such as that shown schematically in and described with reference to FIG. 3. In this case, a computer system may process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one tangible computer readable medium. In either case, the set of data signals may be transmitted/received using any type of communications link.

In still another embodiment, the invention provides a method of generating a system for implementing an automatic microgrid optimization product and/or method. In this case, a computer system, such as computer system 410 (FIG. 4), can be obtained (e.g., created, maintained, made available, etc.), and one or more components for performing a process described herein can be obtained (e.g., created, purchased, used, modified, etc.) and deployed to the computer system. To this extent, the deployment may comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to implement an automatic microgrid optimization product and/or method as described herein. In this case, the service provider can manage (e.g., create, maintain, support, etc.) a computer system, such as computer system 410 (FIG. 4), that performs a process described herein for one or more customers. In return, the service provider can receive payment from the customer(s) under a subscription and/or fee agreement, receive payment from the sale of advertising to one or more third parties, and/or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for controlling a microgrid, the system comprising a dispatch controller configured to communicate with a plurality of microgrid assets, the plurality of microgrid assets including at least one renewable source, the dispatch controller further being configured to:

receive a forecast load on the microgrid;

receive a forecast power production of the at least one renewable source;

determine a renewable capability for each respective renewable power source being treated as an isochronous source, each renewable capability being a parameter representing a percentage of a power rating of the respective renewable source being treated as operating in an isochronous mode;

optimize a solution of an optimization problem associated with microgrid operation over a predetermined time horizon, the solution of the optimization problem being based on at least an objective function associated with microgrid operation, the forecast load, the forecast power production, and the renewable capability of each renewable power source; and determine an optimized dispatch schedule based on the optimized solution, the optimized dispatch schedule including control signals to the plurality of microgrid assets.

2. The system of claim 1, wherein the plurality of microgrid assets includes at least one energy storage device, the dispatch controller is further configured to determine a state of charge of each energy storage device, and the solution of the objective function is further based on the state of charge of each energy storage device.

3. The system of claim 1, wherein the plurality of microgrid assets includes at least one energy storage device, the dispatch controller is further configured to determine a storage capability of each energy storage device, and the solution of the objective function is further based on the storage capability of each energy storage device.

4. The system of claim 1, wherein the plurality of microgrid assets includes at least one energy storage device and the dispatch controller is further configured to determine a maximum power discharge of each energy storage device and the solution of the objective function is further based on the maximum power discharge of each energy storage device.

5. The system of claim 1, wherein the objective function is based on at least a cost of operation of the microgrid.

6. The system of claim 1, wherein a positive slack variable is used with the objective function.

7. The system of claim 6, wherein the positive slack variable is multiplied by a penalty factor.

8. The system of claim 1, wherein the objective function is based at least in part on the relationship:

$$\sum_{t} \sum_{\substack{x \, and \, i \in \left\{ \substack{Non\text{-}renewable, \\ renewable, \, storage} \right\}}} Cost_x(t, i) + P_{Slack}(1) \times K_1 + \sum_{t \neq 1} P_{Slack}(t) \times K_2,$$

where t is a time interval, $Cost_x(t,i)$ is a cost of operation of the microgrid, $P_{Slack}$ is a slack variable, $K_1$ is a respective penalty factor for a first time interval, and $K_2$ is a subsequent respective penalty factor for at least one subsequent time interval, $K_1$ being greater than $K_2$.

9. The system of claim 1, wherein the dispatch controller is further configured to apply at least one asset constraint of each respective renewable source being treated as operating in an isochronous mode, the at least one asset constraint being determined based on at least a power production capability of a respective renewable source.

10. The system of claim 1, wherein the dispatch controller is further configured to apply at least one asset constraint of each respective renewable source being treated as operating in an isochronous mode, the at least one asset constraint being determined based on at least a power rating of a respective renewable source.

11. A dispatch control system configured to operate in response to algorithmic software to generate an optimized dispatch schedule for a plurality of assets of a microgrid, the plurality of assets including a renewable source, the generation of the optimized dispatch schedule being based on at least an objective function associated with operation of the plurality of assets, a forecast load, a forecast power production of the renewable source, and a renewable capability for each respective renewable power source being treated as an isochronous source, each renewable capability being a parameter representing a percentage of a power rating of the respective renewable source being treated as operating in an isochronous mode.

12. The dispatch control system of claim 11, wherein the plurality of microgrid assets includes at least one energy storage device, the system is further configured to determine a state of charge of each energy storage device, and the optimized dispatch schedule is further based on the state of charge of each energy storage device.

13. The dispatch control system of claim 11, wherein the plurality of microgrid assets includes at least one energy storage device, the system is further configured to determine a storage capability of the energy storage device, and the optimized dispatch schedule is further based on the storage capability of each energy storage device.

14. The dispatch control system of claim 11, wherein the plurality of microgrid assets includes at least one energy storage device, the system is further configured to determine a maximum power discharge of each energy storage device, and the optimized dispatch schedule is further based on the maximum power discharge of each energy storage device.

15. The dispatch control system of claim 11, wherein the optimized dispatch schedule is generated to optimize a cost of operation of the microgrid.

16. The dispatch control system of claim 11, wherein a positive slack variable is used with the objective function.

17. The dispatch control system of claim 16, wherein the positive slack variable is multiplied by a penalty factor.

18. The dispatch control system of claim 17, wherein the objective function is based at least in part on the relationship:

$$\sum_{t} \sum_{\substack{x \, and \, i \in \left\{ \substack{Non\text{-}renewable, \\ renewable, \, storage} \right\}}} Cost_x(t, i) + P_{Slack}(1) \times K_1 + \sum_{t \neq 1} P_{Slack}(t) \times K_2,$$

where t is a time interval, $Cost_x(t,i)$ is a cost of operation of the microgrid, $P_{Slack}$ is a slack variable, $K_1$ is a respective penalty factor for a first time interval, and $K_2$ is a subsequent respective penalty factor for at least one subsequent time interval, $K_1$ being greater than $K_2$.

19. The dispatch control system of claim 11, wherein the optimized dispatch schedule is generated based on at least one asset constraint of the respective renewable source, the at least one asset constraint being determined based on a power production capability of the renewable source.

20. The dispatch control system of claim 11, wherein the optimized dispatch schedule is generated based on at least one asset constraint of the respective renewable source, the at least one asset constraint being determined based on a power rating of the renewable source.

* * * * *

UNITED STATES PATENT AND TRADEMARK OFFICE
CERTIFICATE OF CORRECTION

PATENT NO.      : 9,026,259 B2
APPLICATION NO. : 13/358487
DATED           : May 5, 2015
INVENTOR(S)     : Zadeh et al.

It is certified that error appears in the above-identified patent and that said Letters Patent is hereby corrected as shown below:

In the Specification,

Background of the Invention (column 2, line 14) change "can not" to --cannot--.

Detailed Description of the Invention (column 12, line 24) change "optimization program" to --optimization data management program--.

In the Claims,

Claim 4 (column 14, line 54) change "device and" to --device, and--.

Claim 4 (column 14, line 56) change "device and" to --device, and--.

Signed and Sealed this
Third Day of November, 2015

Michelle K. Lee
*Director of the United States Patent and Trademark Office*